(12) United States Patent
Liu et al.

(10) Patent No.: US 10,415,530 B2
(45) Date of Patent: Sep. 17, 2019

(54) SYSTEM AND METHOD FOR OPERATING AN INDEPENDENT SPEED VARIABLE FREQUENCY GENERATOR AS A STARTER

(71) Applicant: The Boeing Company, Chicago, IL (US)

(72) Inventors: Shengyi Liu, Sammamish, WA (US); Lijun Gao, Renton, WA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/872,383

(22) Filed: Jan. 16, 2018

(65) Prior Publication Data

US 2019/0219020 A1 Jul. 18, 2019

(51) Int. Cl.
| | |
|---|---|
| *H02K 7/20* | (2006.01) |
| *H02P 9/04* | (2006.01) |
| *F02N 11/08* | (2006.01) |
| *F02N 11/04* | (2006.01) |
| *H02P 9/30* | (2006.01) |

(52) U.S. Cl.
CPC .......... *F02N 11/0859* (2013.01); *F02N 11/04* (2013.01); *H02P 9/302* (2013.01); *F02N 2011/0896* (2013.01)

(58) Field of Classification Search
CPC ...... F02N 11/04; F02N 11/0859; H02P 9/302; B60K 2006/268; B60Y 2300/63
See application file for complete search history.

(56) References Cited

U.S. PATENT DOCUMENTS

| | | | | | |
|---|---|---|---|---|---|
| 2,896,143 | A | * | 7/1959 | Bekey | H02K 16/025 310/115 |
| 3,348,127 | A | * | 10/1967 | Petersen | H02K 11/042 257/909 |
| 3,809,914 | A | * | 5/1974 | Kilgore | H02P 9/08 290/38 R |
| 4,015,189 | A | * | 3/1977 | Gorden | H02P 9/36 322/46 |
| 4,032,835 | A | * | 6/1977 | Finnell | H02P 9/36 322/86 |
| 4,093,869 | A | * | 6/1978 | Hoffmann | H02K 19/26 290/31 |

(Continued)

OTHER PUBLICATIONS

European Patent Office; Extended European Search Report; European Patent Application No. 18204983.3 dated Jun. 18, 2019.

*Primary Examiner* — Tulsidas C Patel
*Assistant Examiner* — Thomas K Quigley
(74) *Attorney, Agent, or Firm* — Parsons Behle & Latimer

(57) ABSTRACT

A system may include a first bus transfer switch configured to open and close connections between a generator control unit, a pilot permanent magnet generator stage of an independent speed variable frequency (ISVF) generator, and an external power source. The system may further include an inverter configured to set a main field winding of the ISVF generator into a motor state. The system may also include a second bus transfer switch configured to open and close a connection between a main armature winding of the ISVF generator, a power distribution bus, and a motor start driver configured to send a current through the main armature winding to generate a magnetic field pattern that causes the rotor to turn, enabling startup of an engine.

20 Claims, 5 Drawing Sheets

(56) References Cited

U.S. PATENT DOCUMENTS

| | | | | |
|---|---|---|---|---|
| 4,139,807 A * | 2/1979 | Hucker | H02P 1/50 | 318/718 |
| 4,152,636 A * | 5/1979 | Gorden | H02P 9/123 | 322/25 |
| 4,277,733 A * | 7/1981 | Munson | H02P 25/26 | 318/732 |
| 4,336,486 A * | 6/1982 | Gorden | H02P 9/36 | 322/63 |
| 4,625,160 A * | 11/1986 | Hucker | H02K 3/16 | 310/115 |
| 4,743,777 A * | 5/1988 | Shilling | F02N 11/04 | 290/31 |
| 4,830,412 A * | 5/1989 | Raad | F02N 11/04 | 290/31 |
| 4,992,721 A * | 2/1991 | Latos | F02N 11/04 | 290/38 R |
| 5,036,267 A * | 7/1991 | Markunas | F02N 11/04 | 322/10 |
| 5,068,590 A * | 11/1991 | Glennon | F02N 11/04 | 290/38 R |
| 5,581,168 A * | 12/1996 | Rozman | F02N 11/04 | 290/22 |
| 6,051,953 A * | 4/2000 | Vithayathil | H02K 19/12 | 318/700 |
| 9,825,568 B2 * | 11/2017 | Tolksdorf | H02P 9/42 | |
| 10,075,106 B2 * | 9/2018 | Rozman | H02K 19/365 | |
| 2001/0022511 A1 * | 9/2001 | Adams | H02P 9/102 | 322/59 |
| 2004/0113592 A1 * | 6/2004 | Adams | H02H 7/065 | 322/27 |
| 2004/0164695 A1 * | 8/2004 | Hallidy | H02K 17/26 | 318/538 |
| 2005/0046398 A1 | 3/2005 | Anghel et al. | | |
| 2008/0303280 A1 * | 12/2008 | Xu | H02P 9/302 | 290/31 |
| 2008/0309282 A1 * | 12/2008 | Morris | H02P 29/02 | 318/779 |
| 2010/0039073 A1 * | 2/2010 | Santhirahasan | H02P 9/105 | 322/25 |
| 2010/0295301 A1 * | 11/2010 | Huang | F02N 11/04 | 290/31 |
| 2010/0308582 A1 * | 12/2010 | Rozman | H02M 3/156 | 290/31 |
| 2012/0229065 A1 * | 9/2012 | Yokokawa | H02P 9/48 | 318/400.13 |
| 2017/0237383 A1 * | 8/2017 | Buffenbarger | H02P 29/20 | 318/255 |

* cited by examiner

SYSTEM AND METHOD FOR OPERATING AN INDEPENDENT SPEED VARIABLE FREQUENCY GENERATOR AS A STARTER

FIELD OF THE DISCLOSURE

This disclosure is generally related to starting vehicle engines and, in particular, to systems and methods for operating an independent speed variable frequency (ISVF) generator as a starter.

BACKGROUND

Aircraft and other vehicles typically use engines, such as turbine-powered engines, jet engines, combustion engines, etc., as a source of power for propulsion systems and for other mechanical and electrical systems. When the aircraft or other vehicles are not in use, the engines may lie dormant. In order to start the engines and prepare them for use, an external rotational force must usually be applied to initiate a reaction that eventually results in continuation rotation of the engine.

Typical engine startup systems may require an additional motor to initiate the external rotational force on the engine during startup. In some systems, a generator that is typically configured to convert mechanical power from the engine into electrical power may be reversed, converting electrical power to mechanical power that is applied to the engine. In this way, the generator may be effectively used as a motor during engine startup. However, in the case of an ISVF generator, merely applying electrical currents to the output of the motor, as a typical aircraft might do, is not sufficient for engine startup because ISVF motors typically have multiple stages of power generation attached to a single rotor. As such, typical engine start systems are not equipped to work with an ISVF generator. Other disadvantages may exist.

SUMMARY

In an embodiment, a system includes a first bus transfer switch configured to open and close a connection between a generator control unit and a pilot permanent magnet generator stage of an independent speed variable frequency (ISVF) generator and to open and close a connection between the generator control unit and an external power source. The system further includes a transformer configured to transmit a power signal from the generator control unit to a rotor of the ISVF generator. The system also includes an inverter configured to set a main field winding attached to the rotor into a motor state in response to a control signal from the generator control unit. The system includes a second bus transfer switch configured to open and close a connection between a main armature winding of the ISVF generator and a power distribution bus and to open and close a connection between the main armature winding and a motor start driver configured to send a current through the main armature winding to generate a magnetic field pattern that causes the rotor to turn enabling startup of an engine.

In some embodiments, the transformer is a high frequency (HF) transformer having a first winding attached to a stator and a second winding attached to the rotor. In some embodiments, the generator control unit further includes a frequency converter configured to modulate the power signal to form a HF power signal and to drive the first winding of the HF transformer with the HF power signal to cause the HF power signal to be received at the second winding attached to the rotor. In some embodiments, the inverter includes a first set of switches between the main field winding and a rectified power signal distribution branch, and a second set of switches between the main field winding and a neutral voltage branch.

In some embodiments, the main field winding includes three phase lines, and the first set of switches includes three switches and the second set of switches includes three switches, each switch of the first set of switches paired with a respective switch of the second set of switches on a respective phase line of the three phase lines. In some embodiments, the system includes a controller configured to open the first set of switches and close the second set of switches to form an induction motor equivalent circuit. In some embodiments, the system includes a controller configured to pulse operate one switch of the first set of switches, open the remaining switches of the first set of switches, open one switch of the second set of switches, the one switch of the second set of switches paired with the one switch of the first set of switches, and close the remaining switches of the second set of switches to form a synchronous motor equivalent circuit. In some embodiments, the external power source includes a battery or a ground-based power supply.

In an embodiment, a method includes disconnecting a generator control unit from a pilot permanent magnet generator stage of an independent speed variable frequency (ISVF) generator. The method further includes connecting the generator control unit to an external power source. The method also includes transferring a power signal from the generator control unit to a rotor of the ISVF generator. The method includes setting a main field winding attached to the rotor into a motor state. The method further includes disconnecting a main armature winding of the ISVF generator from a power distribution bus. The method also includes connecting the main armature winding to a motor start driver. The method includes sending a current pattern from motor start driver through the main armature winding to generate a magnetic field pattern that causes the rotor to turn enabling startup of an engine.

In some embodiments, the method includes, after startup of the engine, disconnecting the generator control unit from the external power source, and connecting the generator control unit to the pilot permanent magnetic generator stage. In some embodiments, the method includes, after startup of the engine, disconnecting the main armature winding of the ISVF generator from the motor start driver, and connecting the main armature winding to the power distribution bus. In some embodiments, transferring the power signal from the generator control unit to the rotor of the ISVF generator includes modulating the power signal to form a high frequency (HF) power signal, driving a HF transformer winding attached to a stator of the ISVF generator with the HF power signal, and receiving the HF power signal at a HF transformer winding attached to the rotor of the ISVF generator.

In some embodiments, setting the main field winding attached to the rotor into the motor state includes configuring switches of an inverter to form an induction motor equivalent circuit. In some embodiments, configuring switches of the inverter includes opening a first set of switches between the main field winding and a rectified power signal distribution branch, and closing a second set of switches between the main field winding and a neutral voltage branch. In some embodiments, setting the main field winding attached to the rotor into the motor state includes configuring switches of an inverter to form a synchronous motor equivalent circuit.

In some embodiments, configuring switches of the inverter includes pulse operating one switch of a first set of switches between the main field winding and a rectified power signal distribution branch, opening the remaining switches of the first set of switches, opening one switch of a second set of switches between the main field winding and a neutral voltage branch, the one switch of the second set of switches paired with the one switch of the first set of switches, and closing the remaining switches of the second set of switches. In some embodiments, the sending the current pattern from motor start driver through the main armature winding comprises generating a field-oriented control signal or generating a direct torque control signal.

In an embodiment, a system includes a main field winding attached to a rotor of a generator. The system further includes a first set of switches between the main field winding and a rectified power signal distribution branch. The system also includes a second set of switches between the main field winding and a neutral voltage branch. The system includes a controller configured to control the first set of switches and the second set of switches to set the main field winding into a motor state during a startup phase of an engine.

In some embodiments, the main field winding forms an induction motor equivalent circuit while in the motor state. In some embodiments, the main field winding forms a synchronous motor equivalent circuit while in the motor state.

Figure 1:
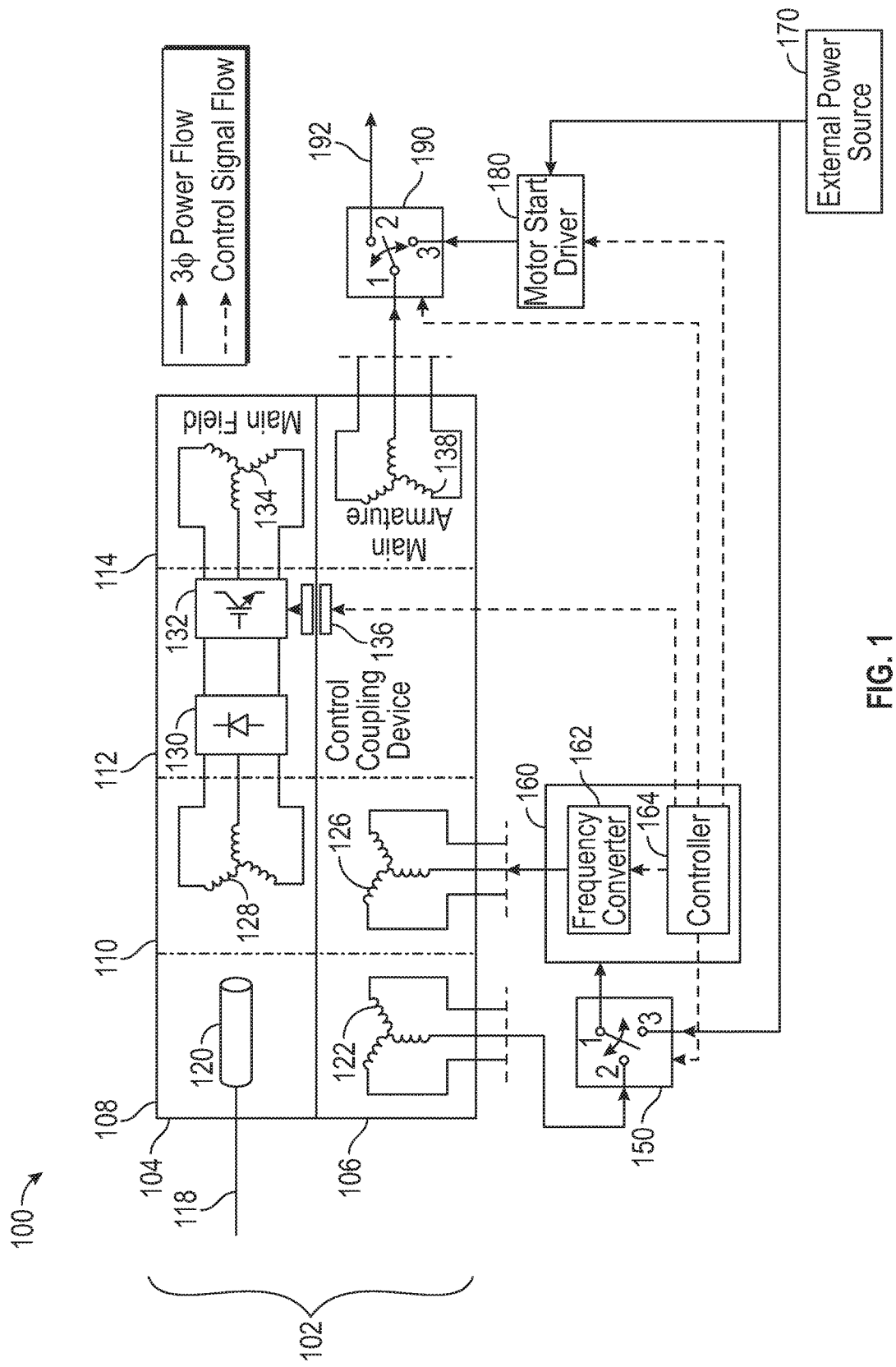
FIG. 1 is a schematic block diagram depicting an embodiment of a system for operating an ISVF generator as a starter.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a system 100 for operating an ISVF generator as a starter is depicted. The system 100 may include an ISVF generator 102, a first bus transfer switch 150, a generator control unit 160, an external power source 170, a motor start driver 180, and a second bus transfer switch 190.

The ISVF generator 102 may include a rotor 104 and a stator 106. Further, power generation at the ISVF generator 102 may be performed in stages. For example, the ISVF generator 102 may include a pilot permanent magnet generator (PMG) stage 108, a high frequency (HF) transformer stage 110, a field control stage 112, and a main machine stage 114. A detailed description of an embodiment of the ISVF generator 102 is contained in U.S. patent application Ser. No. 15/819,919, filed on Nov. 21, 2017 and entitled "Independent Speed Variable Frequency Alternating Current Generator," which is herein incorporated by reference in its entirety. A brief description of the ISVF generator 102 and its stages is also included herein since it may be helpful in understanding the complete system 100.

The pilot PMG stage 108 may include a prime mover input 118 which may be mechanically coupled to a prime mover, such as an engine. Rotation of the engine through the prime mover input 118 may cause the rotor 104 to rotate. Likewise, rotation of the rotor 104 may cause the engine to rotate when it would otherwise be at rest. The pilot PMG stage 108 may further include a permanent magnet 120 attached to the rotor 104 and a pilot winding 122 attached to the stator 106. During power generation, the permanent magnet 120 and the pilot winding 122 may be configured to convert a portion of mechanical energy exhibited by the rotor 104 during rotation into a pilot electrical power signal.

The HF transformer stage 110 may include stator HF transformer windings 126 and rotor HF transformer windings 128. Together, the HF transformer windings 126, 128 form a HF transformer configure to transmit a HF alternating current (AC) power signal from the stator 106 to the rotor 104. During power generation, the HF transformer stage 110 may be used to provide power to the rotor 104 for the field control stage 112 and the main machine stage 114.

The field control stage 112 may include a rectifier 130 and an inverter 132. The rectifier 130 may include circuitry to convert a multi-phase AC power signal into a direct current (DC) power signal. During power generation, the inverter 132 may be controlled to convert the DC power signal back into an AC power signal having a frequency, phase, and magnitude selected to generate a magnetic field at the main machine stage 114 that rotates relative to the rotor 104. A control coupling device 136 may be used to transmit control signals to the inverter 132 from the stator 106 to the rotor 104.

The main machine stage 114 may include main field windings 134 attached to the rotor 104 and main armature windings 138 attached to the stator 106. During power generation, the main machine stage 114 is where an AC power signal for distribution is generated. The main field windings 134 may exhibit a rotating magnetic field relative to the rotor 104. As such, a frequency of the magnetic field picked up at the main armature windings 138 is based on a combination of the rotational frequency of the rotor 104 and the rotational frequency of the rotating magnetic field at the main field windings 134. Therefore, the AC power signal generated at the main armature winding has a frequency that is independent from a rotational frequency of the prime mover.

While the majority of usage of the ISVF generator 102 may be for AC power generation, the first bus transfer switch 150, the generator control unit 160, the external power source 170, the motor start driver 180, and the second bus transfer switch 190 may be used to configure the ISVF generator 102 as a starter for an engine coupled to the prime mover input 118.

The first bus transfer switch 150 may be configured to open and close a connection between the generator control unit 160 and the pilot PMG stage 108 of the ISVF generator 102 and to open and close a connection between the generator control unit 160 and the external power source 170. Although FIG. 1 depicts the inputs and output of the first bus transfer switch 150 as a single line, it should be understood that the inputs and output may represent multi-phase power inputs and outputs. In particular, the inputs and output of the first bus transfer switch 150 may be configured to three-phase power signals.

The generator control unit 160 may include a frequency converter 162 and a controller 164. The frequency converter 162 may include circuitry configured to receive an AC power signal and modulate the AC power signal to create a HF AC power signal for transmission from the stator 106 to the rotor 104. As used herein, a HF AC power signal has a frequency that is greater than a rotational frequency of the rotor 104. In practice, the frequency is sufficiently high to make the effects of the rotational frequency of the rotor 104 negligible with respect to power transfers during the HF transformer stage 110. The frequency converter 162 may include a modulator, an inverter, and/or other modulation circuitry.

The controller 164 may include a microprocessor or another type of controller unit. For example, the controller 164 may include a central processing unit (CPU), a graphical processing unit (GPU), a digital signal processor (DSP), a peripheral interface controller (PIC), another type of microprocessor, or combinations thereof. It may be implemented as an integrated circuit, a field programmable gate array (FPGA), an application specific integrated circuit (ASIC), a combination of logic gate circuitry, other types of digital or analog electrical design components, or combinations thereof. In the case of an ASIC, peripheral components connected to the ASIC may include analog-digital-converters (ADCs), digital-analog-converters (DACs), signal filters, signal amplifiers, input and output interfaces, multi-channel data buses, storage devices, etc.

Although FIG. 1 depicts the controller 164 as enclosed within the generator control unit 160, in some embodiments, portions of the controller 164 may be attached to the rotor 104. The portions of the controller 164 that are attached to the rotor 104 and the portions that are attached to the generator control unit 160 may communicate via the control coupling device 136. The external power source 170 may include a ground-based power distribution system, a generator, a battery, or combinations thereof and may be fixed or moveable relative to the system 100.

The motor start driver 180 may include circuitry configured to apply a current pattern to a motor in order to cause an engine to turn over and start. For example, the motor start driver 180 may be configured to apply a field-oriented control (FOC) signal or generating a direct torque control (DTC) signal to the main armature windings 138 of the ISVF generator 102. The motor start driver 180 may include different types of variable frequency motor drive (VFMD) topologies.

The second bus transfer switch 190 may be configured to open and close a connection between the main armature windings 138 of the ISVF generator and a power distribution bus 192 and to open and close a connection between the main armature windings 138 and the motor start driver 180. As with the first bus transfer switch 150, the inputs and output of the second bus transfer switch 190 may be multi-phase power inputs and outputs. In particular, the inputs and output of the second bus transfer switch 190 may include three-phase power signals.

During operation, the first bus transfer switch 150 may be controlled (e.g., by a user) to disconnect the generator control unit 160 from the pilot PMG stage 108 of the ISVF generator 102 and to connect the generator control unit 160 to the external power source 170. The disconnecting and connecting operations may be performed in response to a single switching operation (e.g., approximately simultaneously) or in response to multiple operations.

The HF transformer may modulate an AC power signal from the external power source 170 to create a HF AC power signal. The HF AC power signal may be transmitted from the generator control unit 160 to the rotor 104 via the HF transformer windings 126, 128. The HF AC power signal may be used to establish communication between the field control stage 112 of the ISVF generator 102 and the generator control unit 160, and to configure the main field windings 134.

The main field windings 134 may be set into a motor state. For example, the main field windings 134 may be electrically shorted by configuring the inverter 132. This may be accomplished by providing gate drive power to the inverter 132 from the rectifier 130 and by providing gate drive control signals to the inverter 132 from the controller 164. In this state, the main machine stage 114 may be effectively equivalent to an induction motor circuit. As another example, the main field windings 134 may be configured such that a direct current from the rectifier 130 may be applied to at least one branch of the main field windings 134. This is accomplished by providing gate drive power to the inverter 132 from the rectifier 130 and by providing gate drive control signals to the inverter 132 from the controller 164. In this state, the main machine stage 114 may be effectively equivalent to a synchronous motor circuit. The specific configuration of the main field winding 134 in these two states is further described herein.

The second bus transfer switch 190 may be controlled to disconnect the main armature windings 138 of the ISVF generator 102 from the power distribution bus 192 and to connect the main armature windings 138 to the motor start driver 180. As with the first bus transfer switch 150, the disconnecting and connecting operations may be performed in response to a single switching operation (e.g., approximately simultaneously) or in response to multiple operations.

Once the first and second bus transfer switches 150, 190 have been set and the ISVF generator 102 has been configured, the controller 164 of the generator control unit 160 may instruct the motor start driver 180 to send a current pattern through the main armature windings 138 to generate a magnetic field pattern that causes the rotor 104 to turn. Turning the rotor 104 may enable startup of the engine.

Once the engine has started, the first bus transfer switch 150 may disconnect the generator control unit 160 from the external power source 170 and connect the generator control unit 160 to the pilot PMG stage 108. Likewise, the second bus transfer switch 190 may disconnect the main armature windings 138 of the ISVF generator 102 from the motor start driver 180 and connect the main armature windings 138 to the power distribution bus 192. The ISVF generator 102 may then be used to generate power.

A benefit of the system 100 is that by configuring the ISVF generator 102 to be used as a starter, an additional motor for starting an engine may be omitted. When used in an aircraft application, this may result in less weight during flight, which may increase the efficiency of the aircraft. Other advantages may exist.

Figure 2:
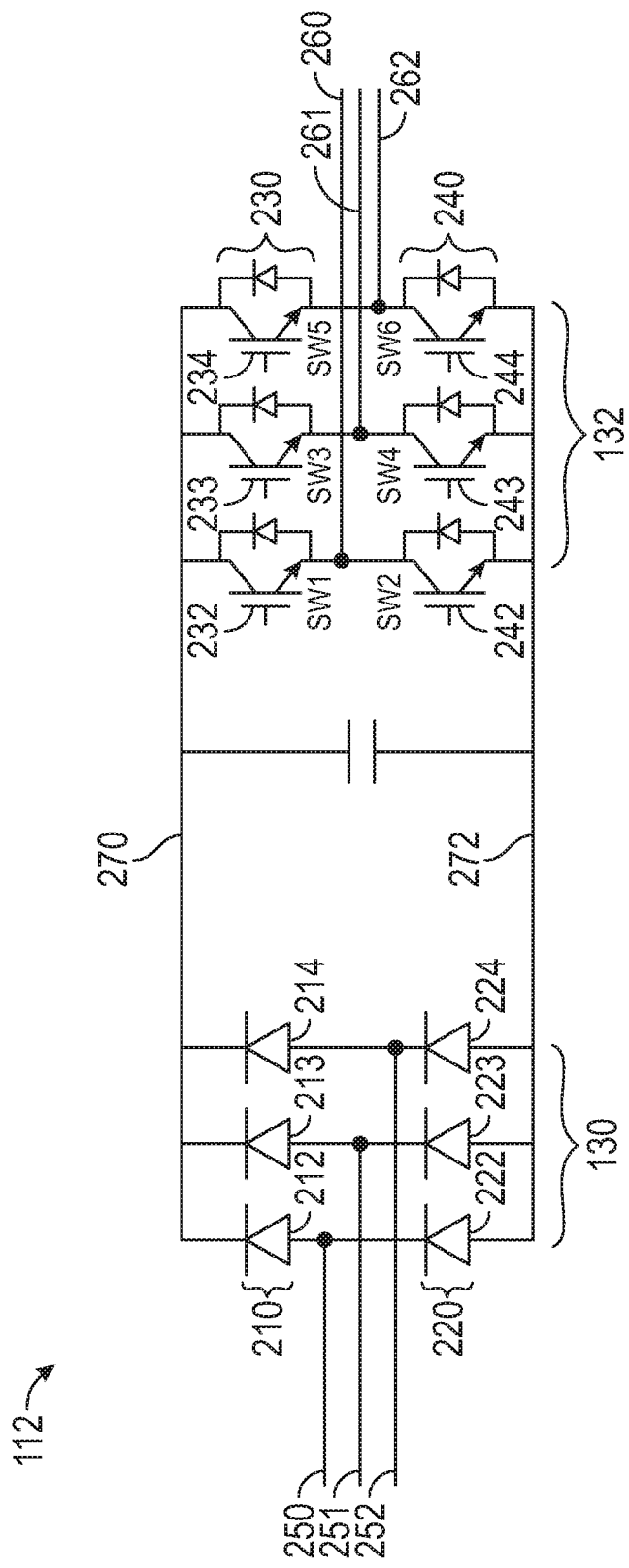
FIG. 2 is a schematic block diagram depicting an embodiment of a field control stage of an ISVF generator.

Referring to FIG. 2, an embodiment of a field control stage 112 attached to a rotor of an ISVF generator is depicted. The field control stage 112 may include a rectifier 130 and an inverter 132. The rectifier 130 may include a first set of diodes 210 and a second set of diodes 220. Each of the first set of diodes 210 may be paired with a corresponding diode of the second set of diodes 220. For example, a first diode 212 of the first set of diodes 210 may be paired with a first diode 222 of the second set of diodes 220, a second diode 213 of the first set of diodes 210 may be paired with a second diode 223 of the second set of diodes 220, and a third diode 214 of the first set of diodes 210 may be paired with a third diode 224 of the second set of diodes 220.

The first diodes 212, 222 may be coupled to a first phase input 250 and may rectify a phase of a HF AC power signal on the first phase input 250 to form a rectified DC power signal on a rectified power signal distribution branch 270. Likewise, the second diodes 213, 223 may rectify a phase of the HF AC power signal on a second phase input 251. The third diodes 214, 224 may rectify a phase of the HF AC power signal on a third phase input 252. As such, a HF AC power signal received at the rectifier 130 may be converted to a DC power signal.

It should be noted that although FIG. 2 depicts the rectifier 130 as performing three-phase rectification, more or fewer than three phases may be rectified. Further, each of the sets of diodes 210, 220 may include more or fewer than three diodes. Also, FIG. 2 depicts one embodiment of a rectifier topology. Other topologies may be used as would be appreciated by persons of ordinary skill in the art having the benefit of this disclosure.

Between the rectifier 130 and the inverter 132, the rectified power signal distribution branch 270 may carry the DC power signal generated by the rectifier 130. A neutral voltage branch 272 may provide a common, or neutral, voltage for powering the inverter 132.

The inverter 132 may include a first set of switches 230 and a second set of switches 240. Each of the first set of switches 230 may be paired with a corresponding switch of the second set of switches 240. For example, a first switch 232 of the first set of switches 230 may be paired with a first switch 242 of the second set of switches 240, a second switch 233 of the first set of switches 230 may be paired with a second switch 243 of the second set of switches 240, and a third switch 234 of the first set of switches 230 may be paired with a third switch 244 of the second set of switches 240.

During power generation, inputs of each of the sets of switches 230, 240 may be operated to modulate the DC power signal from the rectified DC power signal branch 270 to generate a first phase of an AC power signal on a first phase output 260, a second phase of the AC power signal on a second phase output 261, and a third phase of the AC power signal on a third phase output 262. The controller 164 (shown in FIG. 1) of the generator control unit 160 (shown in FIG. 1) may be coupled to the inputs of each of the sets of switches 230, 240 in order to operate them. The AC power signal generated by the inverter 132 may be configured to generate a rotating magnetic field when used to drive a main field winding (e.g., the main field windings 134).

In practice, additional components may be included within the switching topology of the inverter 132. For example, each switch of the sets of switches 230, 240 may include a switch-diode pair. Further, various types of switches may be usable with the disclosure including metal-oxide semiconductor field-effect transistors (MOSFETs), insulated gate bipolar transistors (IGBTs), and/or other types of semiconductor switches. Although FIG. 2 depicts three switches in each of the sets of switches 230, 240, the inverter 132 may include more or fewer than three in order to generate AC power signals having different numbers of phases.

Figure 3A:
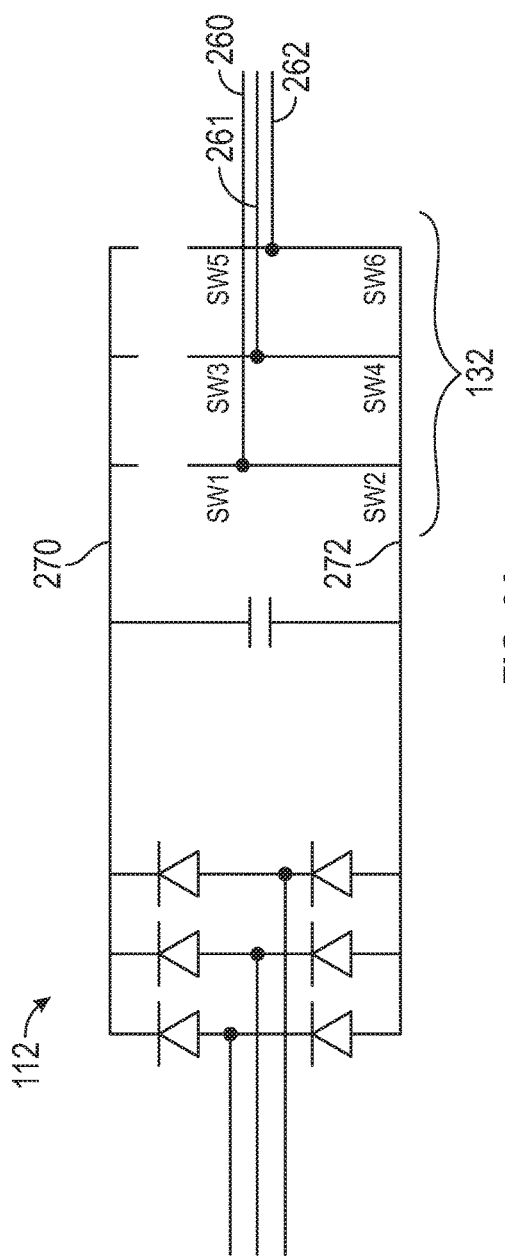
FIG. 3A is a diagram depicting an embodiment of a field control stage in a first state.

Referring to FIG. 3A, the field control stage 112 is depicted in a first state. The first state may be used when engine startup is desired. In the first state, the AC phase outputs 260-262 may be set to effectively form a motor with a main field winding (e.g., the main field windings 134). For example, the first set of switches 230 (shown in FIG. 2) may be opened, and the second set of switches 240 (shown in FIG. 2) may be closed. In this configuration, each of the AC phase outputs 260-262 is disconnected from the rectified DC power distribution branch 270.

Figure 3B:
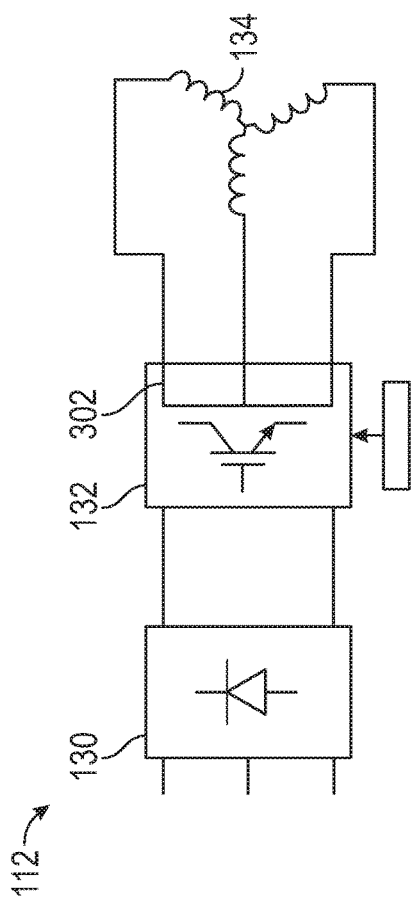
FIG. 3B is a diagram depicting an induction motor equivalent circuit of the field control stage in the first state.

Referring to FIG. 3B, the field control stage 112, being set as described with reference to FIG. 3A, is depicted as an induction motor equivalent circuit. With each of the second set of switches 240 closed an effective short 302 may exist between each phase of the main field windings 134. The short 302 may be the result of each of the phase outputs 260-262 being connected to the neutral voltage branch 272. When acted upon by an external rotating magnetic field (e.g., from the main armature windings 138 of FIG. 1) the main field windings 134 may operate as an induction motor causing an attached rotor (e.g., the rotor 104) to turn.

Figure 4A:
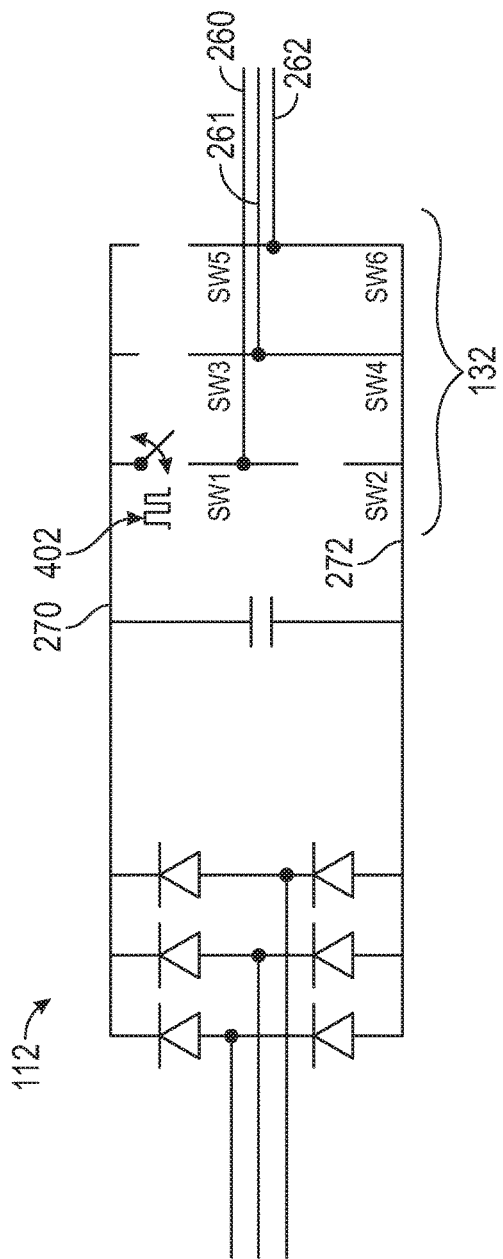
FIG. 4A is a diagram depicting an embodiment of a field control stage in a second state.

Referring to FIG. 4A, the field control stage 112 is depicted in a second state. In the second state, the inverter 132 may be configured to set the AC phase outputs 260-262 to effectively form a synchronous motor with a main field winding (e.g., the main field windings 134). For example, the first switch 232 from the first set of switches 230 may be pulse operated (e.g., rapidly cycled between open and closed at a predetermined rate) as indicated by arrow 402. The remaining switches (the switches 233, 234) from the first set of switches 230 may be opened. The first switch 242 from the second set of switches 240 may be opened as well, while the remaining switches (the switches 243, 244) from the second set of switches 240 may be closed.

Figure 4B:
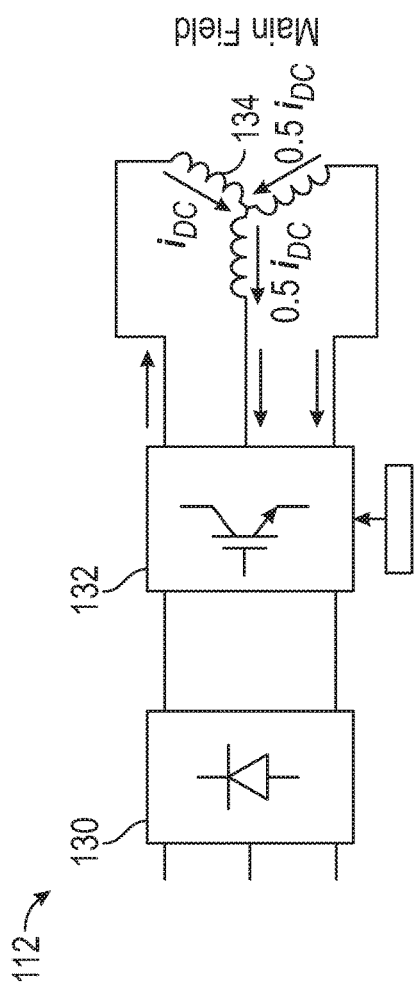
FIG. 4B is a diagram depicting a synchronous motor equivalent circuit of the field control stage in the second state.

Referring to FIG. 4B, the field control stage 112, being set as described with reference to FIG. 4A, is depicted as a synchronous motor equivalent circuit. In this configuration, the pulse operation of the switch 232 may effectively control a DC current ($i_{DC}$) through the main field windings 134. A duty cycle of the pulse may determine the magnitude of the DC current, with a higher duty cycle resulting in a higher current. The DC current through the main field winding may branch equally through the remaining branches of the main field windings 134, result in generating a static magnetic field. By applying a rotating magnetic field to the main field windings 134 (e.g., through the main armature windings 138) the main field windings 134 may operate as a synchronous motor causing an attached rotor (e.g., the rotor 104) to turn.

By operating as an induction motor, a synchronous motor, or any other type of motor, the ISVF generator 102 and, in particular, the field control stage 112 along with the main field windings 134 may enable an engine to be rotated and thereby started without relying on additional and/or external motors. Other benefits may exist.

Figure 5:
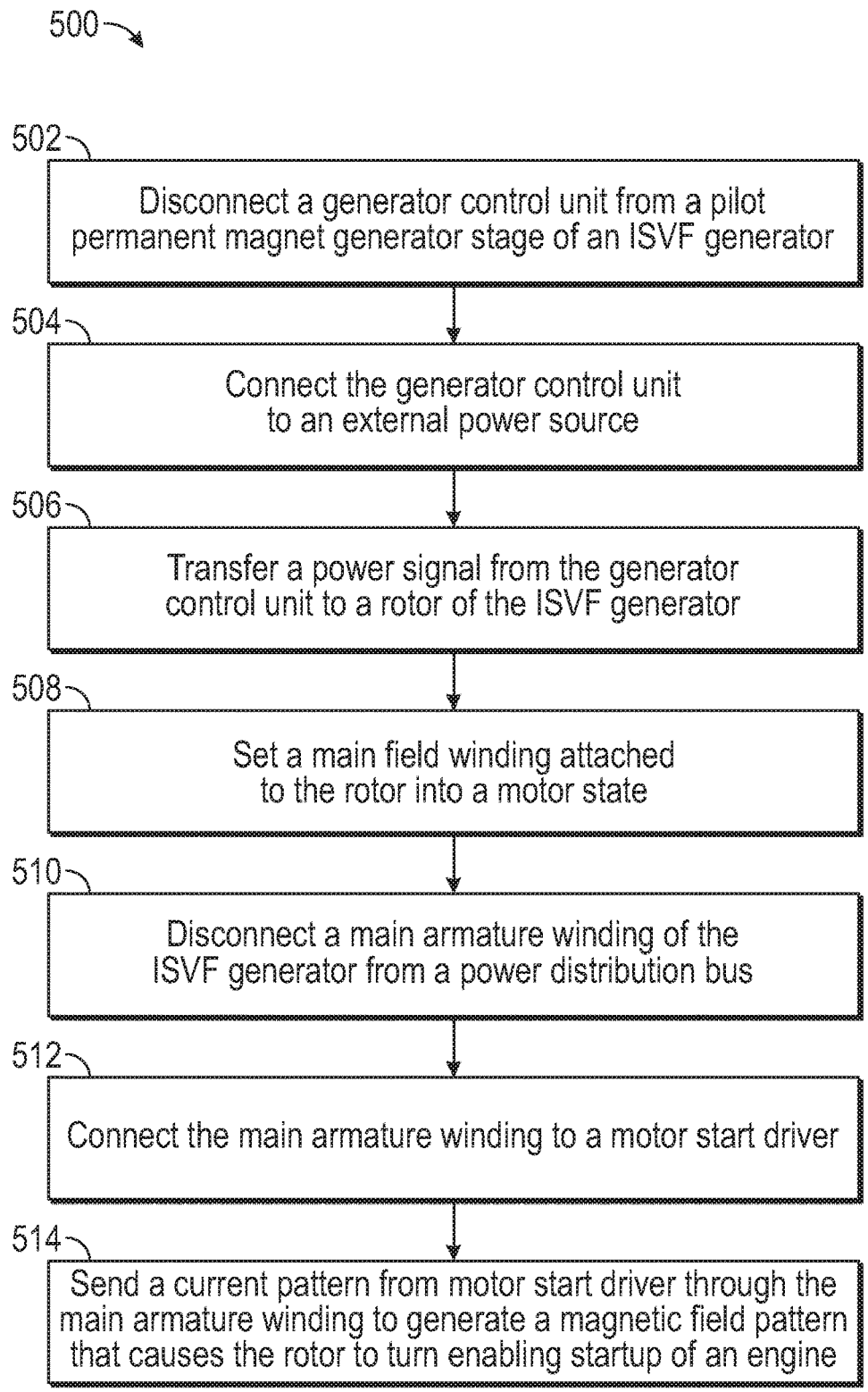
FIG. 5 is a flow diagram depicting a method for operating an ISVF generator as a starter.

Referring to FIG. 5, a method 500 for operating an ISVF generator as a starter is depicted. The method 500 may include disconnecting a generator control unit from a pilot permanent magnet generator stage of an ISVF generator, at

502. For example, the first bus transfer switch 150 may disconnect the generator control unit 160 from the pilot permanent magnet generator stage 108 of the ISVF generator 102.

The method 500 may further include connecting the generator control unit to an external power source, at 504. For example, the first bus transfer switch 150 may connect the generator control unit 160 to the external power source 170.

The method 500 may also include transferring a power signal from the generator control unit to a rotor of the ISVF generator, at 506. For example, the frequency converter 162 may feed a power signal to the stator HF transformer windings 126, which in turn may transfer the power signal to the rotor HF transformer windings 128 on the rotor 104.

The method 500 may include setting a main field winding attached to the rotor into a motor state, at 508. For example, the main field windings 134 may be set into a motor state by the inverter 132 as described herein.

The method 500 may further include disconnecting a main armature winding of the ISVF generator from a power distribution bus, at 510. For example, the second bus transfer switch 190 may disconnect the main armature windings 138 from the power distribution bus 192.

The method 500 may also include connecting the main armature winding to a motor start driver, at 512. For example, the second bus transfer switch 190 may connect the main armature windings 138 to the motor start driver 180.

The method 500 may include sending a current pattern from the motor start driver through the main armature winding to generate a magnetic field pattern that causes the rotor to turn enabling startup of an engine, at 514. For example, the motor start driver 180 may send a current pattern through the main armature windings 138 to generate a magnetic field pattern that causes the rotor 104 to turn.

Although various embodiments have been shown and described, the present disclosure is not so limited and will be understood to include all such modifications and variations as would be apparent to one skilled in the art.

What is claimed is:

1. A system comprising:
a first bus transfer switch configured to open and close a connection between a generator control unit and a pilot permanent magnet generator stage of an independent speed variable frequency (ISVF) generator and to open and close a connection between the generator control unit and an external power source;
a transformer configured to transmit a power signal from the generator control unit to a rotor of the ISVF generator;
an inverter configured to set a main field winding attached to the rotor into a motor state in response to a control signal from the generator control unit; and
a second bus transfer switch configured to open and close a connection between a main armature winding of the ISVF generator and a power distribution bus and to open and close a connection between the main armature winding and a motor start driver configured to send a current through the main armature winding to generate a magnetic field pattern that causes the rotor to turn, enabling startup of an engine.

2. The system of claim 1, wherein the transformer is a high frequency (HF) transformer having a first winding attached to a stator and a second winding attached to the rotor.

3. The system of claim 2, wherein the generator control unit further includes a frequency converter configured to modulate the power signal to form a HF power signal and to drive the first winding of the HF transformer with the HF power signal to cause the HF power signal to be received at the second winding attached to the rotor.

4. The system of claim 1, wherein the inverter comprises:
a first set of switches between the main field winding and a rectified power signal distribution branch; and
a second set of switches between the main field winding and a neutral voltage branch.

5. The system of claim 4, wherein the main field winding includes three phase lines, and wherein the first set of switches includes three switches and the second set of switches includes three switches, each switch of the first set of switches paired with a respective switch of the second set of switches on a respective phase line of the three phase lines.

6. The system of claim 4, further comprising:
a controller configured to open the first set of switches and close the second set of switches to form an induction motor equivalent circuit.

7. The system of claim 4, further comprising:
a controller configured to pulse operate one switch of the first set of switches, open the remaining switches of the first set of switches, open one switch of the second set of switches, the one switch of the second set of switches paired with the one switch of the first set of switches, and close the remaining switches of the second set of switches to form a synchronous motor equivalent circuit.

8. The system of claim 1, wherein the external power source includes a battery or a ground-based power supply.

9. A method comprising:
disconnecting a generator control unit from a pilot permanent magnet generator stage of an independent speed variable frequency (ISVF) generator;
connecting the generator control unit to an external power source;
transferring a power signal from the generator control unit to a rotor of the ISVF generator;
setting a main field winding attached to the rotor into a motor state;
disconnecting a main armature winding of the ISVF generator from a power distribution bus;
connecting the main armature winding to a motor start driver; and
sending a current pattern from the motor start driver through the main armature winding to generate a magnetic field pattern that causes the rotor to turn, enabling startup of an engine.

10. The method of claim 9, further comprising:
after startup of the engine, disconnecting the generator control unit from the external power source; and
connecting the generator control unit to the pilot permanent magnet generator stage.

11. The method of claim 9, further comprising:
after startup of the engine, disconnecting the main armature winding of the ISVF generator from the motor start driver; and
connecting the main armature winding to the power distribution bus.

12. The method of claim 9, wherein transferring the power signal from the generator control unit to the rotor of the ISVF generator comprises:
modulating the power signal to form a high frequency (HF) power signal;

driving a HF transformer winding attached to a stator of the ISVF generator with the HF power signal; and receiving the HF power signal at a HF transformer winding attached to the rotor of the ISVF generator.

13. The method of claim 9, wherein setting the main field winding attached to the rotor into the motor state includes configuring switches of an inverter to form an induction motor equivalent circuit.

14. The method of claim 13, wherein configuring switches of the inverter comprises:

opening a first set of switches between the main field winding and a rectified power signal distribution branch; and closing a second set of switches between the main field winding and a neutral voltage branch.

15. The method of claim 9, wherein setting the main field winding attached to the rotor into the motor state includes configuring switches of an inverter to form a synchronous motor equivalent circuit.

16. The method of claim 15, wherein configuring switches of the inverter comprises:

pulse operating one switch of a first set of switches between the main field winding and a rectified power signal distribution branch;

opening the remaining switches of the first set of switches;

opening one switch of a second set of switches between the main field winding and a neutral voltage branch, the one switch of the second set of switches paired with the one switch of the first set of switches; and closing the remaining switches of the second set of switches.

17. The method of claim 9, wherein sending the current pattern from the motor start driver through the main armature winding comprises generating a field-oriented control signal or generating a direct torque control signal.

18. A system comprising:

a main field winding attached to a rotor of a generator;

a first set of switches between the main field winding and a rectified power signal distribution branch; and a second set of switches between the main field winding and a neutral voltage branch; and a controller configured to control the first set of switches and the second set of switches to set the main field winding into a motor state during a startup phase of an engine.

19. The system of claim 18, wherein the main field winding forms an induction motor equivalent circuit while in the motor state.

20. The system of claim 18, wherein the main field winding forms a synchronous motor equivalent circuit while in the motor state.

* * * * *